No. 705,319. Patented July 22, 1902.
H. T. BUSH.
WATER CLOSET BOWL.
(Application filed Oct. 12, 1899. Renewed May 17, 1902.)
(No Model.)

WITNESSES
Chas. E. Wisner
M. E. Kott

INVENTOR
Hiram T. Bush
By Parker & Burton
Attorneys.

THE NORRIS PETERS CO., PHOTO-LITHO., WASHINGTON, D. C.

UNITED STATES PATENT OFFICE.

HIRAM T. BUSH, OF DETROIT, MICHIGAN.

WATER-CLOSET BOWL.

SPECIFICATION forming part of Letters Patent No. 705,319, dated July 22, 1902.

Application filed October 12, 1899. Renewed May 17, 1902. Serial No. 107,826. (No model.)

*To all whom it may concern:*

Be it known that I, HIRAM T. BUSH, a citizen of the United States, residing at Detroit, county of Wayne, State of Michigan, have invented a certain new and useful Improvement in Water-Closet Bowls; and I declare the following to be a full, clear, and exact description of the invention, such as will enable others skilled in the art to which it pertains to make and use the same, reference being had to the accompanying drawings, which form a part of this specification.

This invention relates to water-closet bowls, and has for its object an improved bowl in which water introduced into the bowl through a tubular rim that surrounds the upper part of the bowl is directed downward obliquely rather than straight, and the motion of the water resulting from the shape of the bowl, the motion of the water in the tubular rim, and the oblique discharge-outlet from said rim cause the water to flow downward along a spiral path and the water is carried around and down, so that it washes the inner surface of the bowl completely.

Figure 2:
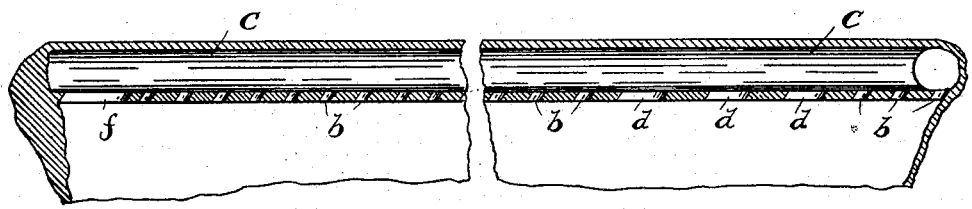
Figure 1:
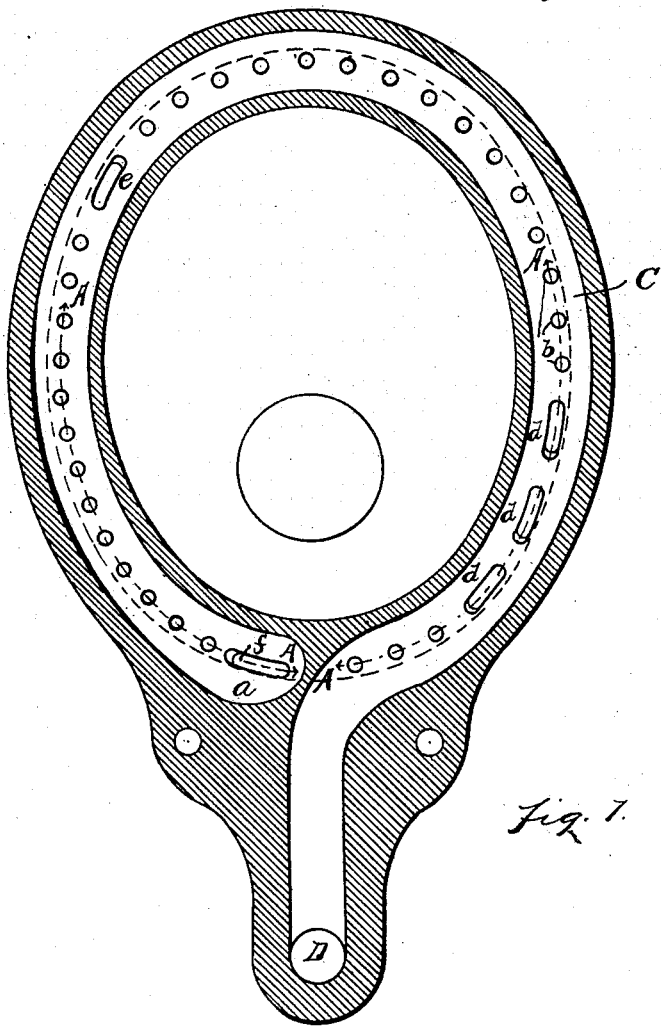

In the drawings, Figure 1 is a horizontal section through the top of the bowl, the section being through the horizontal tubular water-passage that surrounds the upper rim. Fig. 2 is a vertical section taken on the curved line A A A A of Fig. 1.

The bowl may be of any well-known and approved forms of bowls in use having a curvilinear cross-section, the improvement being applicable to either the ordinary trap-bowl or to the siphon-jet style of bowl.

Around the upper rim of the bowl is a passage C, that leads from the water-inlet D, curves around the top of the bowl, and terminates at the back of the bowl at $a$. Through the bottom of the tubular passage C are a number of perforations, all of which are oblique to the passage C. Some of these perforations $b$ are substantially round holes and others, $d$, $e$, and $f$, are oblong holes of large capacity. The oblong holes of large capacity are arranged with reference to the shape of the inner walls of the bowl below the tubular passage and arranged to deliver water in larger quantities at certain places on the inner surface of the bowl than at other places. The large hole $d$ will deliver a larger body of water upon one side and toward the rear part of the bowl, and the large hole $e$ will deliver a large stream of water upon the side toward the front part of the bowl, and these two portions of the surface are the parts where the larger quantities of water are most required.

The large hole $f$ is placed at the end of the passage-way C as a clean-out hole for the passage itself to prevent the accumulation of sedimentary deposit in the passage.

The inner surface of the bowl approaches more nearly to the form of an inverted cone than any other geometrical figure; but its surface is so warped that no strict designating term can be applied to it, and the path of the water running obliquely downward around the surface is not a true spiral, but approximates to a spiral. The water traveling in a spiral traverses a longer path than when it travels directly downward and is pressed against the side of the bowl by the centrifugal force due to the component of its velocity, which is tangential to the horizontal section of the curved walls of the bowl, and consequently greater efficiency is obtained from a given quantity of water. The water entering the tubular rim at one point and all flowing in one direction has a considerable velocity in a direction tangential to the horizontal section of the curved walls of the bowl at every point of said rim, and a portion of said tangential velocity remains as a component of the velocity of the water passing downward in the bowl. The various streams of water in the bowl having tangential velocities in the same direction do not interfere with and impede each other, but unite to form a mass of whirling water in the bowl.

What I claim is—

1. A water-closet bowl having a channeled flushing-rim equipped with large ports near the fluid-entrance to said rim for discharging cleansing fluid upon the rear wall of the bowl, smaller ports located at intervals around said rim, partition at the end of the channel in the rim and a large port adjacent to said partition.

2. A water-closet bowl having a passage for communicating with the pressure-pipe, said passage terminating in a channeled rim having a series of large ports near the inlet end; for discharging a large quantity of water upon the rear wall of the bowl; a series of small ports around the circumference of said rim; and a partition dividing the inlet and discharge ends of said rim.

3. A water-closet bowl consisting of a hopper-shaped receptacle having a flushing-rim at its top, said rim being provided with a series of large ports or openings located near the inlet end of said rim for discharging a large quantity of water upon the rear wall of the bowl; a large port or opening located adjacent to the partition dividing the inlet and delivery portions of said rim and through which water passes to cleanse said partition; and a series of small ports or openings intermediate the large ports, or openings.

4. In combination, with a flushing-tank, a water-closet bowl having a rim provided with a circular channel or passage equipped with ports on its lower side; a partition located between the inlet and final discharge openings on said rim; and a series of large ports and small ports disposed substantially as set forth throughout said rim.

5. The herein-described water-closet bowl, having a rim or channel divided by a partition as set forth, said rim or channel being provided with a series of large ports having inclined walls; two series of small ports also having inclined walls; an intermediate large port or opening with inclined walls; and a large port with inclined walls located adjacent to the partition dividing the inlet and discharge ends of said channel.

In testimony whereof I sign this specification in the presence of two witnesses.

HIRAM T. BUSH.

Witnesses:
 CHARLES F. BURTON,
 MARION A. REEVE.